United States Patent
Tinker et al.

(10) Patent No.: US 7,735,265 B2
(45) Date of Patent: Jun. 15, 2010

(54) FOAM RIGIDIZED INFLATABLE STRUCTURAL ASSEMBLIES

(75) Inventors: Michael L. Tinker, New Market, AL (US); Andrew R. Schnell, Murfreesboro, TN (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 167 days.

(21) Appl. No.: 11/780,610

(22) Filed: Jul. 20, 2007

(65) Prior Publication Data

US 2009/0019784 A1    Jan. 22, 2009

(51) Int. Cl.
*E04G 11/04* (2006.01)
*E04H 15/20* (2006.01)
*E04B 1/00* (2006.01)

(52) U.S. Cl. .................. 52/2.16; 52/2.11; 52/2.13; 52/2.15; 52/2.18; 52/2.21; 52/742.14

(58) Field of Classification Search ............. 52/2.15, 52/2.18, 2.19, 2.21, 2.22, 742.14, 2.11, 2.13
See application file for complete search history.

(56) References Cited

U.S. PATENT DOCUMENTS

| | | | |
|---|---|---|---|
| 2,751,953 A * | 6/1956 | Grimm | 383/3 |
| 3,044,515 A * | 7/1962 | Eades | 383/3 |
| 3,098,229 A | 7/1963 | Raabe | |
| 3,110,552 A | 11/1963 | Voelker | |
| 3,144,219 A | 8/1964 | Schnitzer | |
| 3,326,624 A | 6/1967 | Maydell et al. | |
| 3,329,750 A | 7/1967 | Growald | |
| 3,508,270 A | 4/1970 | Cook | |
| 3,845,184 A | 10/1974 | Nackaerts | |
| 4,024,679 A | 5/1977 | Rain et al. | |
| 4,206,785 A | 6/1980 | Graafmann et al. | |
| 4,277,204 A * | 7/1981 | Koppers et al. | 405/288 |
| 4,587,777 A | 5/1986 | Vasques et al. | |
| 4,730,797 A | 3/1988 | Minovitch | |
| 4,795,136 A * | 1/1989 | Haefner | 254/336 |
| 4,825,599 A | 5/1989 | Swann, Jr. | |
| 4,880,186 A * | 11/1989 | Mecca | 244/158.3 |
| 4,961,699 A | 10/1990 | Moore | |
| 4,983,077 A * | 1/1991 | Sorge et al. | 405/288 |

(Continued)

OTHER PUBLICATIONS

Schnell, Andrew, An Investigation into the Fabrication of Foam-Rigidized Inflatables, Aug. 10, 2001, pp. 1-6.

(Continued)

*Primary Examiner*—Brian E Glessner
*Assistant Examiner*—Omar Hijaz
(74) *Attorney, Agent, or Firm*—James J. McGroary; David A. Belasco (57) ABSTRACT

An inflatable and rigidizable structure for use as a habitat or a load bearing structure is disclosed. The structure consists of an outer wall and an inner wall defining a containment member and a bladder. The bladder is pressurized to erect the structure from an initially collapsed state. The containment member is subsequently injected with rigidizable fluid through an arrangement of injection ports. Exhaust gases from the curing rigidizable fluid are vented through an arrangement of exhaust ports. The rate of erection can be controlled by frictional engagement with a container or by using a tether. A method for fabricating a tubular structure is disclosed.

16 Claims, 8 Drawing Sheets

U.S. PATENT DOCUMENTS

| | | | |
|---|---|---|---|
| 5,044,579 A * | 9/1991 | Bernasconi et al. | 244/158.3 |
| 5,058,330 A | 10/1991 | Chow | |
| 5,271,583 A | 12/1993 | Minovitch | |
| 5,339,574 A | 8/1994 | Downing | |
| 5,350,138 A | 9/1994 | Culbertson et al. | |
| 5,429,851 A * | 7/1995 | Sallee | 428/71 |
| 5,493,816 A * | 2/1996 | Willemsen | 52/2.11 |
| 5,546,707 A * | 8/1996 | Caruso | 52/2.13 |
| 5,664,373 A | 9/1997 | Downing | |
| 6,231,010 B1 | 5/2001 | Schneider et al. | |
| 6,394,707 B1 * | 5/2002 | Kennedy et al. | 405/288 |
| 6,439,508 B1 | 8/2002 | Taylor | |
| 6,467,221 B1 | 10/2002 | Bigelow | |
| 6,547,189 B1 | 4/2003 | Raboin et al. | |
| 6,637,159 B1 * | 10/2003 | Heath | 52/2.21 |
| 6,910,308 B2 * | 6/2005 | Cadogan et al. | 52/646 |
| 6,963,315 B2 * | 11/2005 | Gierow et al. | 343/872 |
| 2002/0023390 A1 | 2/2002 | Nagle | |
| 2002/0083653 A1 | 7/2002 | Hilbert | |
| 2005/0205137 A1 * | 9/2005 | Pouchkarev | 137/571 |

OTHER PUBLICATIONS

Schnell, A. R., Tinker, M. L., Buckling, Stiffness, and Modal Characterization of Foam-Rigidized Thin Film Deployable Structures, AIAA, 2003, pp. 1-6, AIAA-2003-1826, USA.

* cited by examiner

FOAM RIGIDIZED INFLATABLE STRUCTURAL ASSEMBLIES

STATEMENT OF GOVERNMENT INTEREST

This invention was made in part by employees of the United States Government and may be manufactured and used by or for the Government of the United States of America for government purposes without payment of any royalties thereon or therefore.

FIELD OF INVENTION

The invention pertains to inflatable, rigidizable, and deployable structures. More particularly, the invention relates to load bearing structures or habitation structures adapted for use in terrestrial and extraterrestrial environments.

BACKGROUND OF THE INVENTION

Many civil and aerospace engineering structures are designed for ease of transport and storage, weight and financial economy. For these reasons, a number of inflatable and rigidizable structures have been developed. One problem which has not been fully addressed is the issue of providing uniform rigidization throughout the structure, particularly when larger structures or assembled structures are constructed. Some relevant examples of prior art include the following.

U.S. Pat. No. 3,098,229, issued to Raabe, discloses an inflatable and rigidizable transmission line. The transmission lines are prefabricated and folded or rolled up into a package. At a desired time, the transmission line is unfurled and inflated to a deployed position by injecting an expansible material into the interior of the transmission line. One embodiment consists of two concentric plastic tubes. The innermost tube is inflated to deploy the structure. Rigidizable material is subsequently injected into the space between the inner and outer tubes. However, Raabe does not provide a gas escape mechanism to relieve out gassing of the rigidizable material. Nor does Raabe address the issue of uniform injection of rigidizable material.

U.S. Pat. No. 3,110,552, issued to Voelker describes a structure having an inner cavity surrounded by double walls. The inner cavity can be inflated to give the structure a desired shape. A metered amount of mixed chemicals, which foam and rigidize upon heating is deposited between the double walls. The rigid foam provides structural support. The invention also includes a vent to permit escape of excess gases released from the foam. However, the invention does not suggest a specific venting or escape mechanism design configuration nor address specific issues such as gas escape optimization and pressure barrier build up. Nor does Voelker address the issue of distributing foam uniformly throughout the double walls.

U.S. Pat. No. 5,058,330, issued to Chow discloses a spheroidal habitat structure having a pressurizable inner core and fabric layer walls. Rigidizable foam is filled in between the fabric layers to provide structural strength. The invention does not address rigidization of extended structures.

U.S. Pat. No. 3,405,886, issued to Gosnell discloses a method of making an inflatable erectable hollow structure. The structure walls are fabricated from a plastic impregnated wall material. The walls are then treated with a non-permanent softening agent, and collapsed into a container. The structure can be inflated and venting orifices are provided for venting exhaust gases emanating from the softening agent.

U.S. Pat. No. 5,044,579, issued to Bernasconi discloses curable inflatable flexible tubes that form the skeleton of a larger structure. The tubes are prefabricated, pre-assembled, and coated on the inside with a curable laminate. The assembly can be inflated and unfolded using a single pressure source. Rigidization is achieved using a gaseous chemical catalyser injected in the same way as the pressurizing gas. The unfolding rate is controlled using a series of valves and diaphragms in the connectors between the tubes.

U.S. Pat. No. 4,880,186 issued to Mecca discloses a prefabricated structure deployed from a container using pressurized foam. The structure is a cylindrical double walled structure formed from a flexible material. The walls are initially bonded together with adhesive when the structure is folded inside a container. Foam injected between the walls at an annular edge releases the walls and deploys the structure.

U.S. Pat. No. 5,339,574 issued to Downing discloses an inflatable rigidizable structure consisting of at least three flexible walls. The flexible walls define an innermost cavity and an outermost cavity. The outermost cavity is pressurized with gas to give the structure shape. The innermost cavity is then injected with curable mold material to rigidize the structure. The outermost cavity can then be deflated and injected with curable mold.

It is an objective of the present invention to provide an inflatable structure that is capable of being remotely and inflatably deployed. It is a further objective of the invention to provide a container to package and controllably deploy the structure. It is a further objective that such a structure can be rigidized by injecting a rigidizable fluid into the walls of the structure. It is a further objective that the rigidizable fluid be injected and distributed uniformly throughout the walls to prevent deformations or weaknesses in the structure. It is a further objective that the invention can be scaled to relatively large sizes, or assembled with other similar structures using the same technology. It is still a further objective that the structure may be used to deploy and erect other structures. Finally, it is an objective to provide a structure that is simple and inexpensive to produce while fulfilling all of the described performance criteria. While some of the objectives of the present invention are disclosed in the prior art, none of the inventions found include all of the requirements identified.

SUMMARY OF THE INVENTION

The present invention satisfies the objectives described above.

One embodiment of the present invention provides a rigidizable fluid and a container for the fluid. The container or containment member has at least one outer wall forming a closed vessel. The containment member further includes at least one opening and at least one exhaust port. The rigidizable fluid is injected, potentially though an injection port, or poured into the containment member through an opening. As the rigidizable fluid becomes rigid, it may release gases creating a pressure barrier. The pressure barrier may prevent the rigidizable fluid from advancing throughout the structure. In order to address this problem, excess pressure in the containment member can be exhausted through at least one exhaust port. If there is more than one outer wall, the innermost wall forms the containment member and the outermost wall may be a protective layer. The outermost wall may be selected to protect the structure against puncture from debris, rocks, meteors and the like, or from harmful radiation. The outer wall thickness may be selected for such properties as stiffness and strength or other desirable characteristics.

In an alternative embodiment, the structure further includes an inflatable bladder. The bladder is attached to the containment member and has at least one pressurizing port. The bladder can be inflated through the pressurizing port. Inflation of the bladder member also erects the containment member and gives the structure its shape prior to rigidization. The bladder member may be inflated with any gas or liquid. In the case of a biosphere, such as a habitat, the bladder provides a space that can support living organisms.

Another embodiment of the present invention provides a method for erecting and rigidizing a structure having an inflatable bladder attached to a containment member. The containment member includes at least one inner wall and at least one outer wall. First, the bladder is inflated to erect the structure. Then rigidizable fluid is introduced uniformly into the containment member between the inner wall and the outer wall by pouring or injection. The rigidizable fluid advances throughout the containment member and may release gas as it cures. The released gas is vented from the containment member to prevent the released gas from impeding the uniform distribution of injected rigidizable fluid.

In a further variant of the method, the rigidizable fluid is injected through an arrangement of injection ports placed at one end of the structure. The curing rigidizable fluid is vented using an arrangement of exhaust ports. The venting arrangement is designed according to the shape of the structure. For example, in an elongated body it is generally preferable to place the venting ports at a second end opposite the first end. For a large body, it may be preferable to distribute venting ports uniformly across the structure.

In another embodiment, the present invention provides a method for fabricating a tubular wall as follows: A tubular mold with a predetermined cross-section, a predetermined perimeter, and a predetermined length is selected. A section of flexible material with a predetermined length, and a width greater than the predetermined perimeter is also selected. It should be noted that a length shorter than the tubular mold may be selected, and such reduced length would facilitate ease of work. The width of flexible material is wrapped around the tubular mold and the two ends of the width are secured together forming a seam. The tubular mold is removed leaving a tubular wall having a first end and a second end. In another variant of the method, the tubular mold selected is a section of PVC pipe. In another embodiment, the present invention includes a plurality of rigidizable fluid containment areas and a network of transfer hoses, wherein the structure takes the form of a useful article selected from the group comprising: an enclosed storage structure including at least one movable door. The structure may be an enclosed dwelling structure including at least one door and at least one window, a support for equipment including a base and at least one component not in the plane of the base, and/or an open topped fluid container. Additional forms include a truss structure consisting of numerous tubular inflatable and rigidizable members, or alternatively the arrangement comprising a toroidal structure and tubular support structures, wherein the toroid can support a Fresnel lens, parabolic reflector or lens, or other components, and a framework for supporting advertising displays, aircraft wings and spacecraft appendages, wherein appendages may include solar panels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
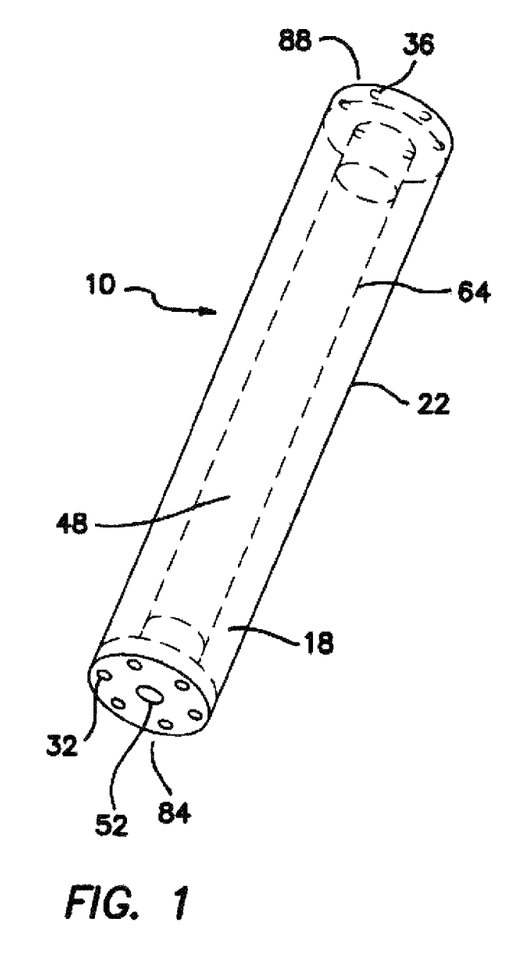
FIG. 1 is a perspective view of a first embodiment of the invention illustrating a tubular outer wall, a tubular inner wall, a containment member, a bladder, foam insertion openings, a plurality of exhaust ports.

One embodiment of the present invention provides a means of construction, deployment, and rigidization of inflatable annular cross-sectional structural booms. Referring now to FIG. 1, which is a perspective view of a boom structure. In this embodiment, the structure is shown to substantially circular exterior cross-section. The structure is further provided with an outer wall 22, an inner wall 64, at least one exhaust port 36, and a plurality of openings 32. Although six such openings 32 are depicted, a different number could also be used. These openings 32 are arranged on a first end 84 of the boom structure 10. The exhaust ports 36 are on a second end 88. Generally, they will be equally spaced around a central axis. The openings 32 are configured to allow for the introduction of rigidizable fluid into the structure 10. The structure 10 may further include an inflatable bladder 48. When present, the bladder 48 is attached to the containment member 18 and has at least one pressurizing port 52. The bladder 48 may be attached using a variety of mechanisms, such as a spacer or a plug. The bladder 48 may be inflated via the pressurizing port 52. Inflation of the bladder 48 also erects the containment member 18 and gives the structure 10 its shape prior to rigidization. The rigidization fluid may be introduced after inflation of the bladder, or placed in the structure prior to packaging, depending on the selected rigidization approach and fluid composition. The bladder 48 may be inflated with any fluid, liquid, or gas. In the case of a biosphere, such as a habitat, the bladder provides a space that can support living organisms. In some cases the inner wall 64 serves as the bladder wall, while in other embodiments the bladder 48 impinges on the inner wall 64. The bladder 48 is generally designed to be substantially impermeable, during the rigidization period.

Figure 2:
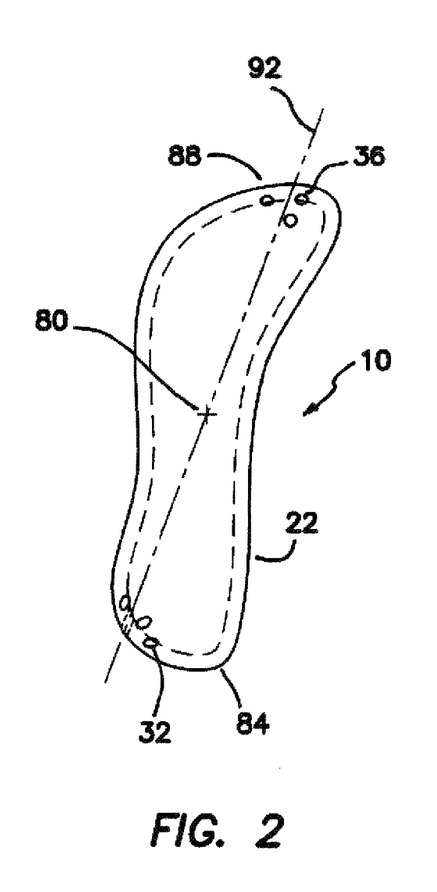
FIG. 2 is an illustration of a second embodiment showing an arbitrary shaped structure.

Referring now to FIG. 2 wherein an arbitrary shaped structure of the present invention is presented. The structure 10 has a plurality of openings 32, which are arranged on the first end 84 of the structure 10 and around the axis 92 in order to uniformly introduce a rigidizable fluid into the structure 10 and around the axis 92. It should be noted that the term "rigidizable" refers to a material characteristic. When a rigidizable fluid is referred to, it suggests that the fluid can itself become rigid or can precipitate a change in another material, which results in the other material taking on characteristics that are consistent with a rigid material. The use of the term rigid is understood to countenance substantially rigid, as would be understood by one of ordinary skill in the art. The structure is further provided with an outer wall 22, an inner wall (not shown), and at least one exhaust port 36. In this embodiment, the central point 80, first end 84 and second end 88 are selected to lie on the imaginary axis 92. The opening 32 is positioned at the first end 84 and an exhaust port 36 at the second end 88.

Figure 3:
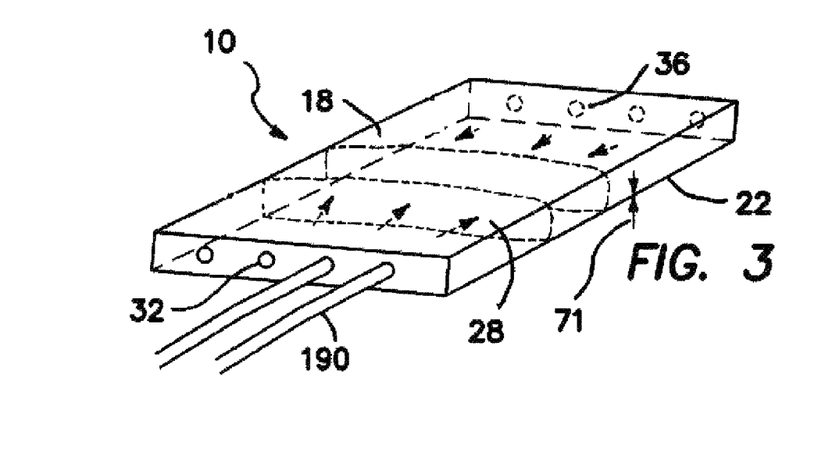
FIG. 3 is a perspective view of a third embodiment illustrating a tubular structure with an outer wall and a rectangular cross-section as might be used as a sail.

FIG. 3 is a perspective view illustrating a tubular structure with an outer wall and a rectangular cross-section with potential application as a sail, or other similar structure. Specifically, at least one injection hose 190 is attached to the opening 32 to transfer rigidizable fluid from a rigidizable fluid source. The injection hose 190 may be removed after inflation of the structure 10 or remain permanently attached. In operation the rigidizable fluid is provided to a containment member 18, the containment member 18 has at least one outer wall 22 forming a closed vessel 28. The containment member 18 further includes at least one sealable opening 32 and at least one exhaust port 36. The rigidizable fluid is injected, or poured into the containment member 18 through the opening 32. At least one spacer 49 is provided to prevent the structure 10 from bulging in central regions. Although the spacer is indicated as a rigid or semi-rigid structure traversing the perimeter of the structure 10 the at least one spacer could also take the form of a plurality of strings or wires that would provide restraint against bulging. The vertical restraints are generally selected to possess sufficient strength while possessing a minimum cross-sectional area, so as not to interfere with the distribution of the rigidizable fluid. Suitable materials include metal wire, silk thread/string, other high tensile strength fibers, polymers, and polymer composites as is known to one of ordinary skill in the art. In other embodiments the rectangular cross-sectional area includes a plurality of circles, rectangles, or squares. In some embodiments the structure will use a plurality of the tubular structures illustrated at FIG. 8 which are fastened together to form a substantially rectangular cross-section with a reduced likelihood of bulging. These structures may be created by using two rectangular sheets of heat sealable polyimide film and creating a plurality of seals running substantially the length of the structure 10. An outer cover may also be provided to create a substantially flat surface. The structure in FIG. 8 could exist with a rectangular or square cross-section which would allow for a larger connective interface and a flatter surface on the structure 10. As the rigidizable fluid becomes rigid, it may release gases creating a pressure barrier. The pressure barrier may prevent the rigidizable fluid from advancing throughout the structure 10. In order to address this problem, excess pressure in the containment member 18 can be exhausted through the exhaust port 36. If there is more than one outer wall 22, the innermost wall forms the containment member 18 and the outermost wall may be a protective layer. The outermost wall may be selected to protect the structure against puncture from debris, rocks, meteors and the like, or from harmful radiation. The outer wall thickness 71 may be selected for such properties as strength, weight, and stiffness.

Figure 4:
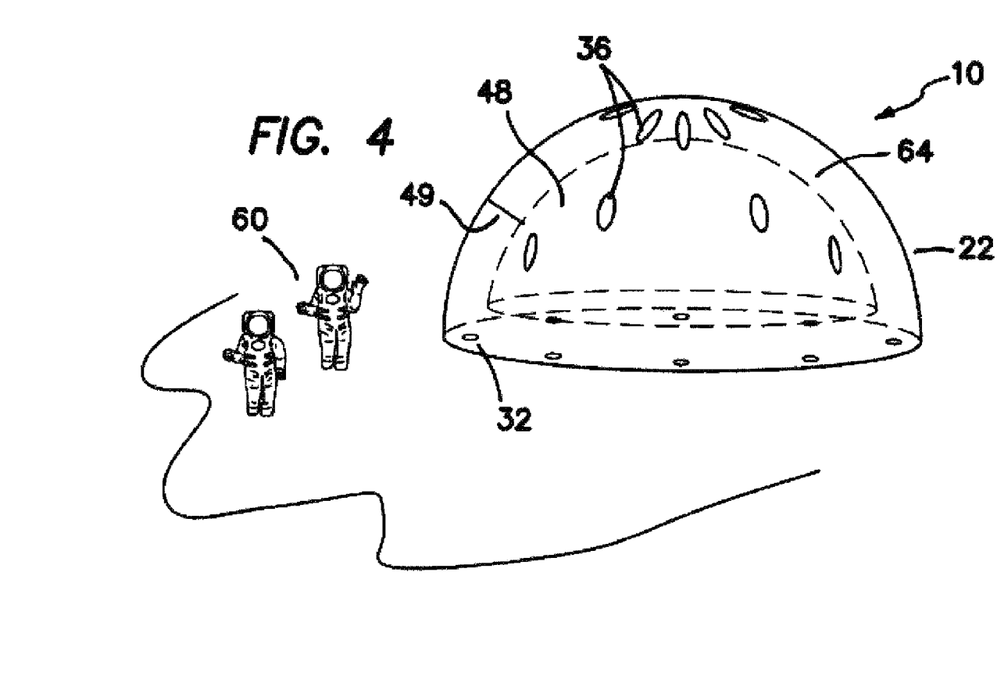
FIG. 4 is a perspective view of a fourth embodiment illustrating a dome shaped inner wall, a dome shaped outer wall as might be used for a habitation, as for astronauts for example.

A perspective view of a dome like structure is provided in FIG. 4. A dome shaped structure 10 is provided. The rigidizable fluid is injected through an arrangement of injection ports 32. Venting is achieved with the aid of an arrangement of exhaust ports 36. The venting arrangement is designed according to the shape of the structure 10. For a large body, it may be preferable to distribute venting ports 36 uniformly across the structure 10. In this illustration, at least one outer wall 22 is selected to function in a given environment. The structure 10 further includes an inflatable bladder 48. The bladder 48 may be attached using a variety of mechanisms, such as a spacer 49. The spacer 49 may take the form of a rigid or substantially rigid member, or may take the form of a substantively inelastic string, rope, or wire. When the structure is complete 10 it may be made suitable to support living organisms or man 60.

Figure 5:
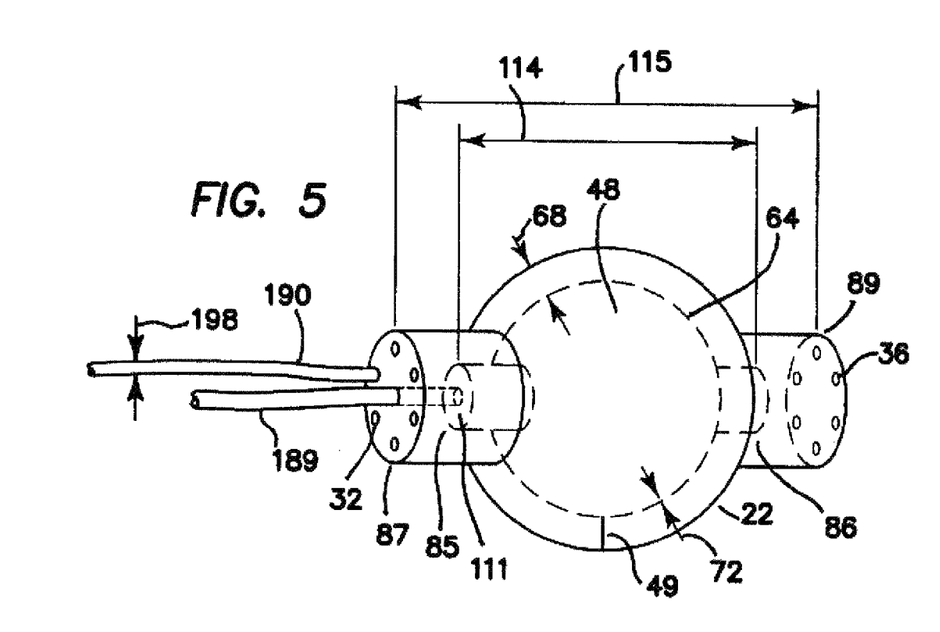
FIG. 5 is a perspective view of a fifth embodiment illustrating a spherical shaped inner wall, a spherical shaped outer wall, a tubular base and foam injection hoses.

FIG. 5 is a cross-sectional view of a fifth embodiment illustrating a spherical shaped inner wall 64, a spherical shaped outer wall 22, a tubular base and rigidizable foam injection hose 190 having a predetermined external cross-section 198. The cross-section 198 enables the hose 190 to be inserted into the opening 32 and the rigidizable fluid to be delivered to a space between the inner wall 64 and the outer wall 22. The first end 87 includes at least one opening 32 providing access to introduce rigidizable fluid into the containment region, which is defined by the inner and outer walls respectively. The second end 89 includes at least one exhaust port 36 for venting excess gases in the containment member. The inner wall thickness 72 and predetermined distance 68 may be selected for such properties as stiffness or strength. The hose 190 may be controllably removed as the containment member fills with rigidizable fluid. The inner wall 64 is separated from the outer wall 22 by a pre-determined distance 68. The first end 85 has at least one pressure port for providing access to inflate the bladder 48. The bladder 48 may be attached using a variety of mechanisms, such as a spacer 49. The outer wall length 115 and the inner wall length 114 maybe different. The cross-section 111 of the inner wall may be made to vary in a predetermined way between the first end 85 and the second end 86. Further, it is contemplated that at least one pressurizing hose 189 will be provided as a means for inflating the bladder 48.

As discussed above, FIG. 6 provides a perspective view of a tubular structure. The plug 50 is formed from at least one tube or disc 104 having a central axis 92. A plug 50 includes at least one opening 32 into a space defined by the inner wall 64 and outer wall 22 with an annular cross-sectional area 96. The annular opening with cross-sectional area 96 is sealable with plug 50 having a matching cross-section 99. The plug 50 is removable. The openings 32 are arranged on the plug 50 around the axis 92. A plurality of exhaust ports 36 are arranged on the plug on the opposite end of the cylindrically shaped structure. The opening 97 is sealable with a plug 54 having a matching cross-section 100. The plug 54 may be removed if desired. The pressurizing port 52 allows the volume in 97 to be pressurized and press a bladder to define an inner wall 64, thereby defining a space with cross-sectional area 96, which is fillable with a rigidizable fluid.

Figure 7:
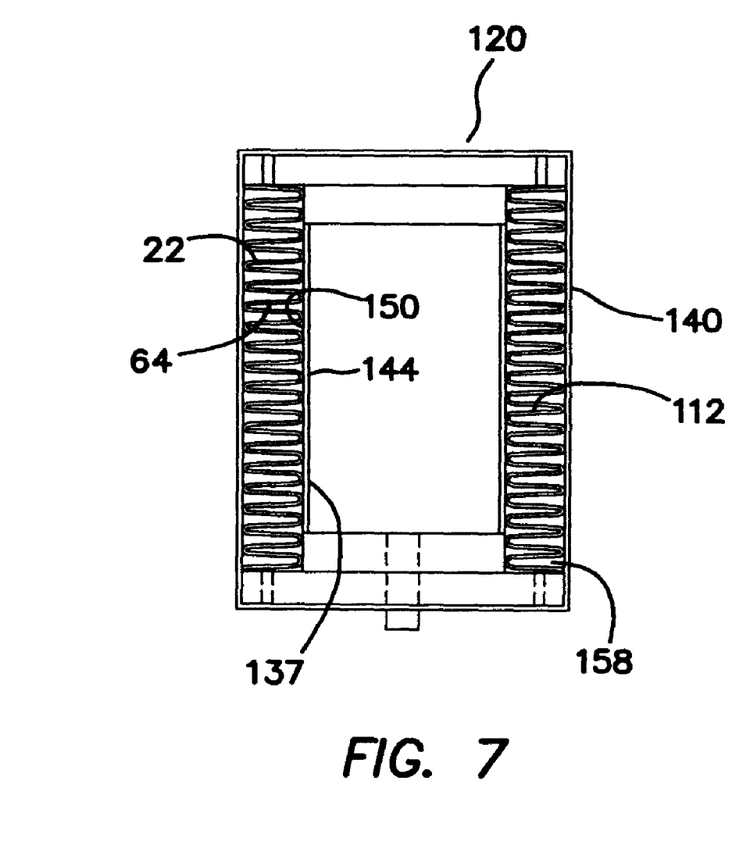
FIG. 7 is a cross-section of the FIG. 1 embodiment collapsed inside a container illustrating the inner wall surrounding the container inner surface, the container wall surrounding the outer wall and end plugs.

In a variant, illustrated in FIG. 7 the inner wall 64 is a first tube 112. The first tube 112 has an axis, a first predetermined length, a first end, and a second end. The outer wall 22 comprises a second tube having an axis co-axial with the first tube 112, a second predetermined length, a third end and a fourth end. The structure is collapsed longitudinally along the tube axis. A container 120 is also provided to contain the collapsed structure and provide support during deployment. The container 120 is formed from a third tube and a fourth tube 140. The third tube includes a first inner surface, a first outer surface, a third pre-determined length shorter than the first pre-determined length and the second pre-determined length. The first inner surface 144 is concentrically surrounded by the collapsed inner wall 64. When the bladder is inflated and the structure is erected from the container, the first outer surface 150 frictionally engages the inner wall 64 thereby controlling the erection rate out of the container. The fourth tube 140 has a second inner surface 158 and a second outer surface. The second outer surface surrounds the inner wall 64 and the outer wall 22. When the bladder is inflated the second inner surface 158 frictionally engages the outer wall 22 thereby controllably erecting the structure 10 out of the container.

Figure 7A:
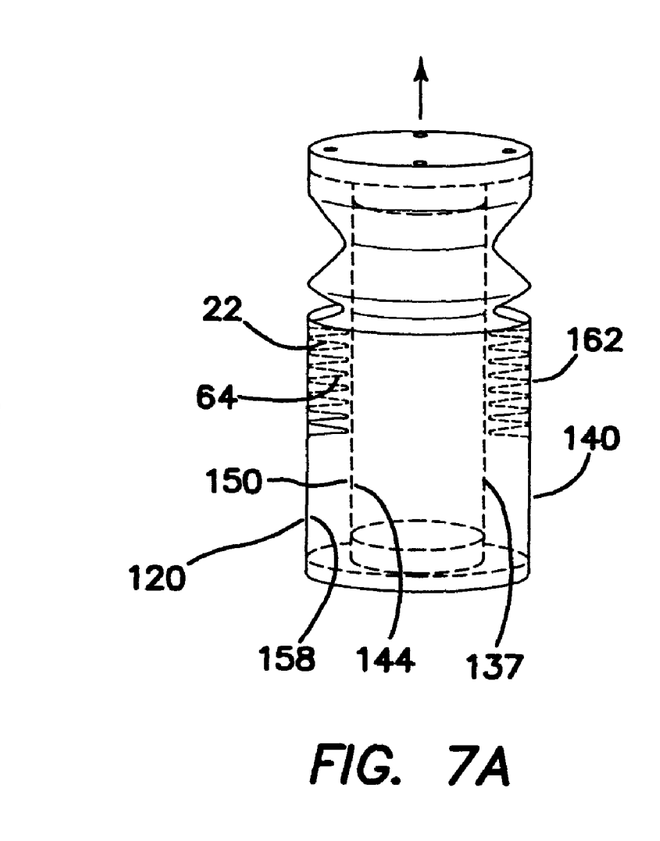
FIG. 7A is a perspective view of the FIG. 1 embodiment being erected from the container as the bladder is inflated and the container walls frictionally engage the structure walls.
Figures 8, 9, 10, 11, 12:
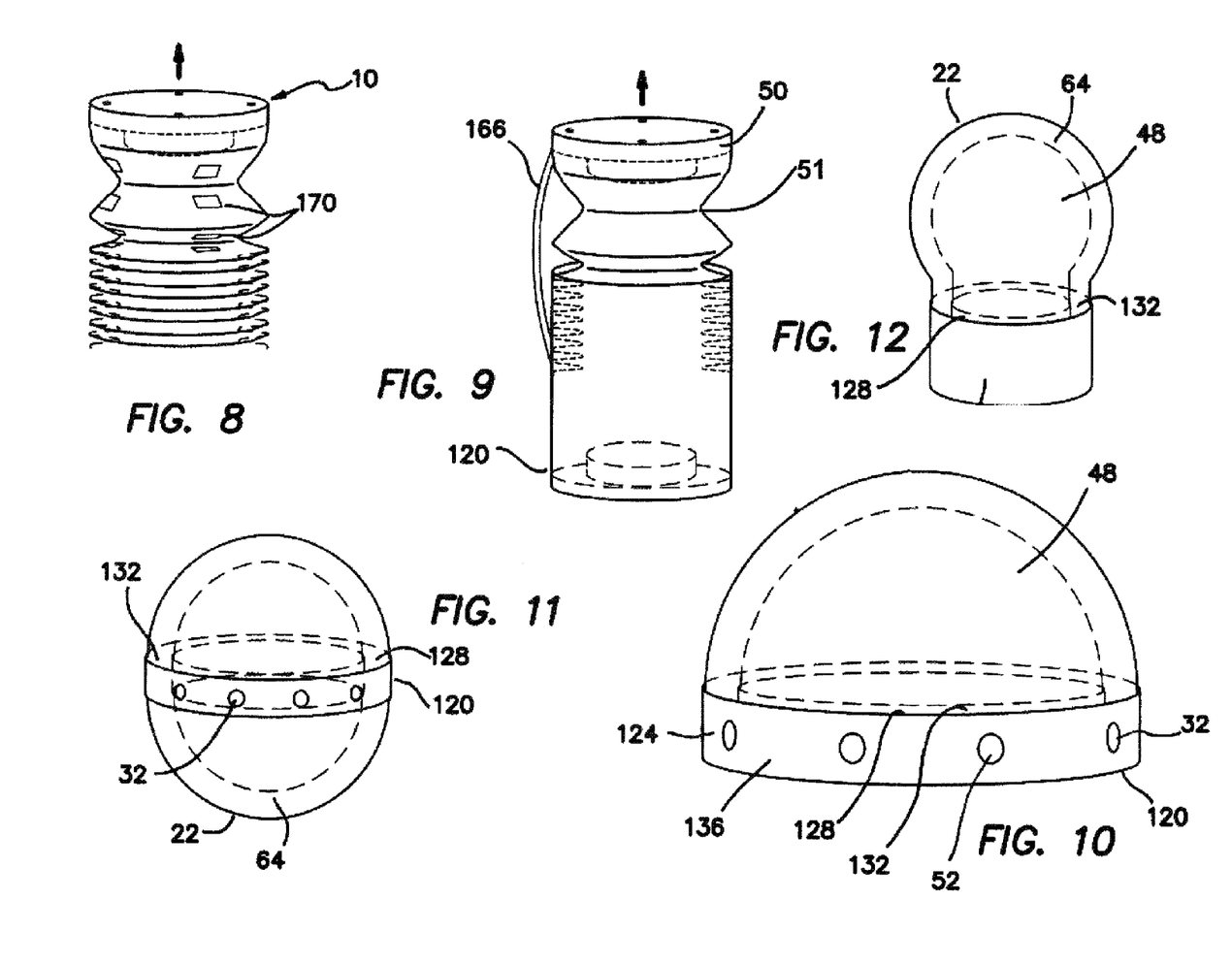
FIG. 8 is a perspective view of a sixth embodiment illustrating a tubular structure with fasteners being deployed and the fasteners releasing as the bladder is inflated or the containment member is filled with rigidizable fluid.
FIG. 9 is a perspective view of a seventh embodiment illustrating a tubular structure being controllably erected from a container with a tether.
FIG. 10 is a perspective view of an eighth embodiment illustrating a dome shaped structure erected from a container.
FIG. 11 is a perspective view of a ninth embodiment illustrating a spherical shaped structure erected from a container.
FIG. 12 is a perspective view of a tenth embodiment illustrating a spherical shaped structure erected from a container.

FIG. 7A discloses an inner wall 64 that is a first tube with an axis, a first predetermined length, a first, and a second end. The outer wall 22 comprises a second tube having an axis co-axial with the first tube, a second predetermined length, a third end and a fourth end. The structure is collapsed longitudinally along the tube axis. A container 120 is also provided to contain the collapsed structure and provide support during deployment. The container 120 is formed from a third tube 137 and a fourth tube 140. The third tube 137 includes a first inner surface 144, a first outer surface 150, a third pre-determined length shorter than the first pre-determined length and the second pre-determined length. The first inner surface 144 is concentrically surrounded by the collapsed inner wall 64. When the bladder is inflated and the structure is erected from the container, the first outer surface 150 frictionally engages the inner wall 64 thereby controlling the erection rate out of the container. The fourth tube 140 has a second inner surface 158 and a second outer surface 162. The second outer surface 162 surrounds the inner wall 64 and the outer wall 22. When the bladder is inflated the second inner surface 158 frictionally engages the outer wall 22 thereby controllably erecting the structure out of the container. In FIG. 8 fasteners 170 are attached to the structure 10. The fasteners 170 are arranged in a series along the length of the structure 10. Each of the fasteners 170 can fasten with another fastener when the structure 10 is collapsed. When the structure 10 is erected, the fasteners 170 provide some resistance as they release, thereby controlling the erection of the structure 10. The fastening can be achieved using a variety of fasteners. Examples of fasteners 170 include magnets and hook and loop type fasteners such as those sold under the brand name of VELCRO®.

In FIG. 9, a container 120 for the structure is provided and the structure is collapsed inside the container 120. A tether 166 is also provided. The tether 166 is attached to the structure and the container, in this case the plug 50. When the structure is erected from the container, the tether 166 is controllably reeled out thereby controlling the erection of the structure out of the container 120. In another variant the tether can be attached either inside or outside the structure. In this embodiment, if the tether was attached inside the structure it would preferably be aligned with the central axis of the structure.

FIG. 10 is a dome shaped structure erected from a container. The container 120 includes a container wall 124 defining an interior space 128. The container wall 124 has an interior surface 132 and an exterior surface 136. The structure may be collapsed and contained within the interior space 128. The bladder 48 can be inflated through the pressurizing port 52. Inflation of the bladder 48 also erects the containment member and gives the structure its shape prior to rigidization. The bladder 48 may be inflated with any gas or liquid. In the case of a biosphere, such as a habitat, the bladder provides a space that can support living organisms.

A spherical shaped structure erected from a container is depicted in FIG. 11, where the container 120 includes a container wall defining an interior space 128. The container wall has an interior surface 132 and an exterior surface. The structure may be collapsed and contained within the interior space 128. The rigidizable fluid is injected, or poured into the containment member through the opening 32. The outer wall 22 and the inner wall 64 can be fabricated from materials such as polyimide film, other thin film, fabric, and composite fabric. The selection of the material will be motivated by the properties required in the deployment environment.

FIG. 12 is another spherical shaped structure erected from a container. The container 120 includes a container wall defining an interior space 128. The container wall has an interior surface 132 and an exterior surface 136. The structure may be collapsed and contained within the interior space 128. The bladder 48 can be inflated through the pressurizing port (not shown). Inflation of the bladder 48 also erects the containment member and gives the structure its shape prior to rigidization. The outer wall 22 and the inner wall 64 can be fabricated from materials, the selection of which will be motivated by the properties required in the deployment environment, or alternatively based on an ideal based on an optimized hybrid of a plurality of likely deployment environments.

Figure 13:
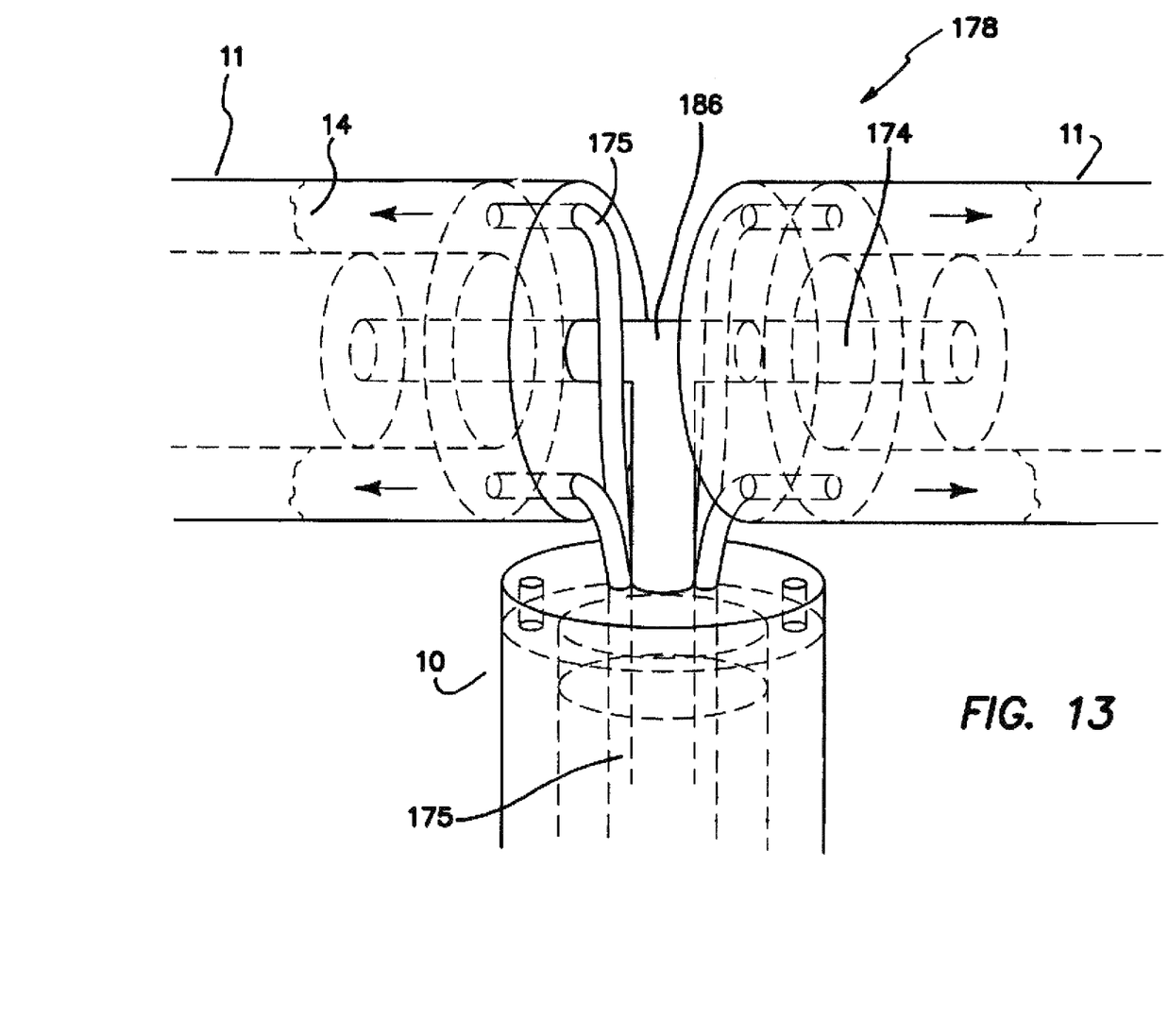
FIG. 13 is a perspective view of a structural assembly illustrating a structure connected to additional structures, a connector, pressure transfer hoses and rigidizing fluid transfer hoses.

In FIG. 13 is an enlarged view of a plurality of components, as they might be used in an aggregated system. Wherein at least one pressure transfer hose 174 is provided. The pressure transfer hose 174 is attached to or contained within the structure 10. The pressure transfer hose 174 can be used to transfer pressure to an additional bladder in an additional structure 11. This may be particularly desirable when assembling several structures 10 together to form an assembled structure 178. A single pressurizing source can be used to inflate an entire assembly 178. Further, at least one rigidizable fluid transfer hose 175 is provided; the transfer hoses 175 can all be fed from a single source which can be proximally located to the source for the pressure transfer hose. In some embodiments a least one hose is required for each bladder, thus limiting the number of bladders. In other embodiments, the rigidizable fluid can be delivered, via a single house, to a manifold where it can be distributed. The rigidizable fluid could go through a number of manifolds to optimally distribute the rigidizable fluid to a plurality of relatively remote locations. The transfer hose 175 is attached to or contained within the structure 10. The transfer hose 175 can be used for transferring rigidizable fluid 14 into at least one additional containment member. This may be particularly desirable when assembling several structures 10 together to form an assembled structure 178. A single rigidizable fluid source can be used to rigidize an entire assembly 178. An example of an assembly might include a support for a parabolic dish or Fresnel lens. A connector 186 may be provided. The connector 186 attaches to the structure 10 and at least one additional structure 11. Importantly, the connector 186 need not be a "T" as illustrated, but could take many other shapes including a cross an "X," a "Y," a or a 5 point, six point, seven point or eight point shape. Additional points could be added if required. A central wheel-like structure may be used to accommodate additional points, or spokes. The angle that the points or spokes will take may be adjusted according to the structure that is being erected. In the case of a geodesic dome, there may be six spokes and a central hub, which serves as a manifold. The spokes may also include an articulating joint at or near the terminus of the spoke. Other mechanisms may be utilized to provide articulation of spokes, such as accordion-like joints that may be rotated then locked into place. The available degrees of freedom may be limited according to the intended structure. The connector 186 may be used to securely connect structures 10 together to form an assembled construction 178, such as a support structure for a parabolic dish. The connector 186 may be used to deploy or move additional structures 11 when the bladder is inflated or when rigidizable fluid 14 is injected into the containment member. The connector 186 is shaped with a rotatable angled elbow. This may be useful when connecting structures 10 together at an angle. The angle may be any angle including 90 degrees. The connector 186 may also be rotatable relative to the structures 10 to enable flexibility in the formation of the assembly. In another variant, the connector 186 is adapted to connect with several structures 10. Examples include a T-shaped connector 186 or a cross-shaped connector.

Figure 14:
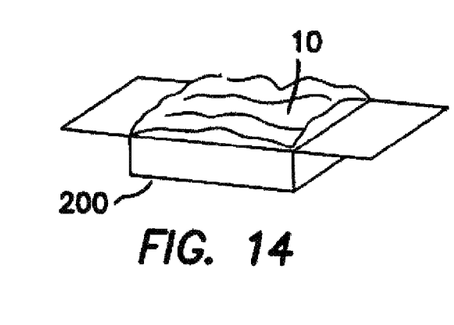
FIG. 14 is a perspective view of an eleventh embodiment of the invention contained in a packaging container.
Figure 14A:
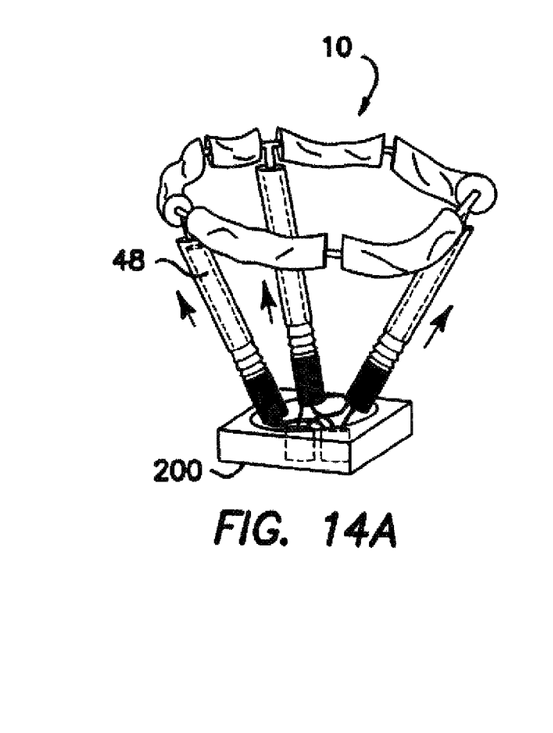
FIG. 14A is a perspective view of a twelfth embodiment being deployed from a container.
Figures 14B, 14C:
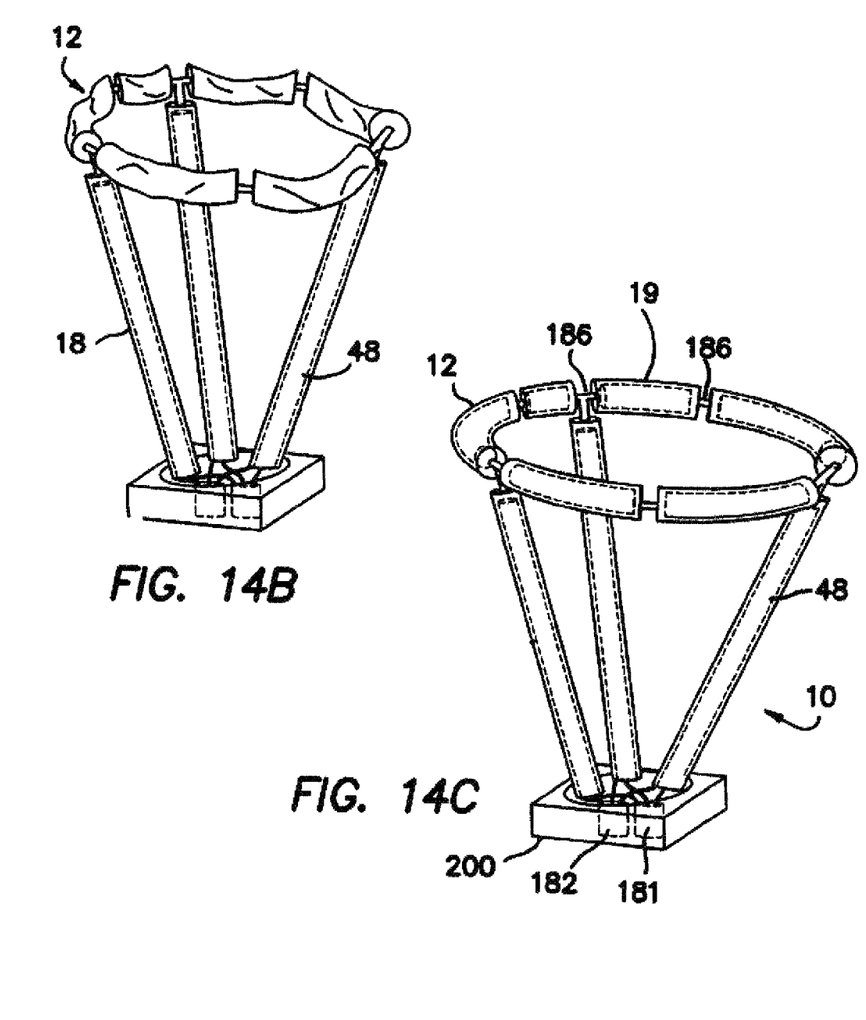
FIG. 14B is a perspective view of the twelfth embodiment illustrating a torus shaped structure supported by tubular booms after inflation of the support structures and prior to rigidization of the torus segments.
FIG. 14C is a perspective view of the twelfth embodiment illustrating a torus shaped structure supported by tubular booms after inflation and rigidization.

One embodiment of the present invention contained in a packaging container is provided in FIG. 14, where a container 200 is provided. The container 200 is able to contain at least one structure 10 when the structure 10 is collapsed by folding. FIG. 14A depicts the structure 10 being deployed from a container 200. FIG. 14B illustrates a torus shaped structure 12 supported by tubular booms after inflation of the support structures and prior to rigidization of the torus segments. The bladder 48 is attached to the containment member 18. FIG. 14C is a torus shaped structure 12 supported by tubular booms after inflation and rigidization. Also shown is an additional containment member 19. A single rigidizable fluid source 182 can be used to rigidize an entire assembly. A connector 186 attaches to the structure 10. The connector 186 may be used to securely connect structures 10 together to form an assembled construction 178, such as a support structure for a parabolic dish. A single pressurizing source 181 can be used to inflate an entire assembly.

Figure 15:
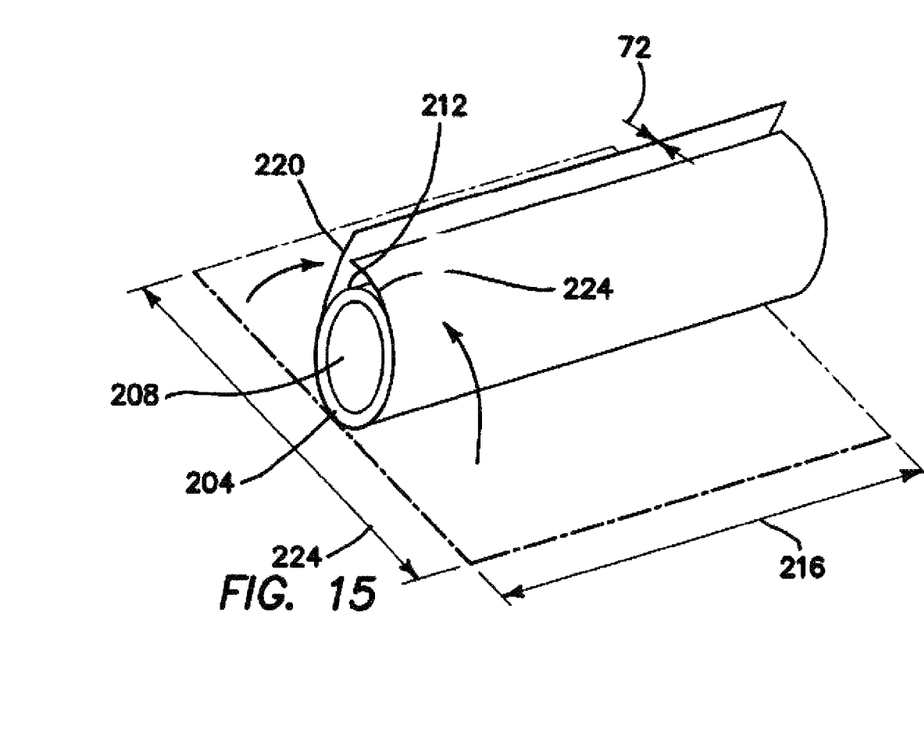
FIG. 15 is a perspective view showing the fabrication of a tubular wall illustrating wrapping material around a mold.

FIG. 15 is a perspective view showing the fabrication of a tubular wall illustrating wrapping material around a mold. A tubular mold 204 with a predetermined cross-section 208, a predetermined perimeter 212, and a predetermined length 216 is selected. A section of flexible material 220 with the same predetermined length 216 and a width 224 greater than the predetermined perimeter 212 is also selected. The width of flexible material 224 is wrapped around the tubular mold 204. The two ends of the width 224 are secured together forming a seam. The tubular mold 204 is removed leaving a tubular wall having a first and second end. The inner wall thickness 72 may be selected for such properties as stiffness or strength.

Figure 16:
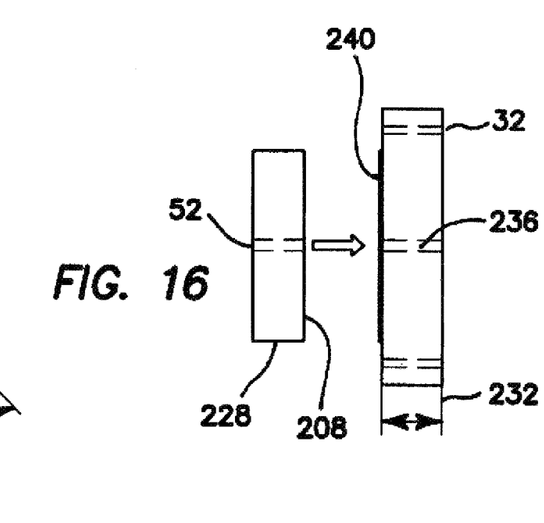
FIG. 16 is an illustration showing the manufacture of end plugs with openings and pressure ports.

The manufacture of end plugs with openings and pressure ports is depicted in FIG. 16, where a solid disc 228 is shaped from lightweight material. The disc has a height 232 and the same pre-determined cross-section 208 as the tubular mold 204 as shown in FIG. 15. The cross-section is bored with at least one bore 236 extending along the entire length of the disc height 232. The disc 228 is attached to the tube first end. An identical disc can be manufactured for attachment to the second tube end. The disc 228 may be attached with silicone adhesive 240, epoxy or other adhesive or adhering agent. Further, at least one pressurizing port 52 is provided and a plurality of openings 32 are arranged to uniformly introduce the rigidizable fluid into the structure.

Referring back to FIGS. 1 and 2, the plurality of openings 32 are arranged on the first end 84 of the structure 10 and around the axis 92 in order to uniformly introduce the rigidizable fluid into the structure. In alternative embodiments the plurality of openings 32 are arranged on the first end of the structure 10 and around the axis 92 in order to uniformly introduce the rigidizable fluid into the structure. Alternately, or additionally, a plurality of exhaust ports 36 are arranged on the second end of the structure and around the axis 92, in order to uniformly exhaust pressure from the structure. The ends could also be diametrically opposed points on a sphere.

The rigidizable structure according to an embodiment of the present invention is illustrated in FIG. 3, where a containment member 18 for the rigidizable fluid has at least one outer wall 22 forming a closed vessel 28. The containment member 18 further includes at least one sealable opening 32 and at least one exhaust port 36. The rigidizable fluid is injected, poured, or otherwise introduced into the containment member 18 through the opening 32. As the rigidizable fluid rigidizes, it may release gases, which would potentially create a pressure barrier. The injection hose 190 may be attached to the opening 32 to transfer rigidizable fluid from a rigidizable fluid source (not shown). The pressure barrier, if not allowed to escape may prevent the rigidizable fluid from advancing throughout the structure 10. In order to address this problem, excess pressure in the containment member 18 can be exhausted through the exhaust port 36. If there is more than one outer wall 22, the innermost wall forms the containment member 18 and the outermost wall may be a protective layer. The outermost wall may be selected to protect the structure against puncture from debris, rocks, meteors and the like, or from harmful radiation. The outer wall thickness 71 may be selected for such properties as strength, weight, and stiffness.

Figure 6:
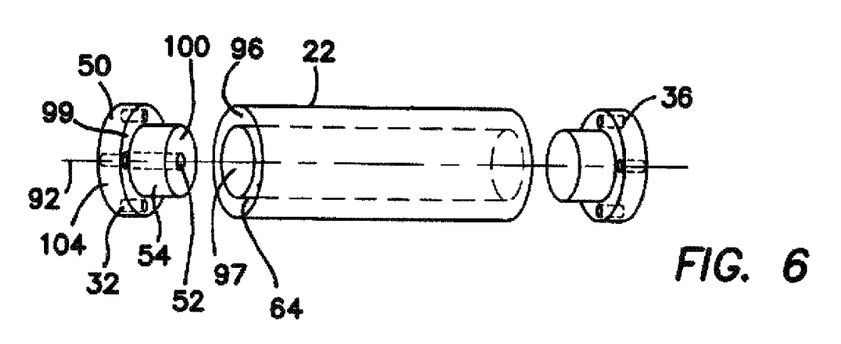
FIG. 6 is a perspective view of the FIG. 1 embodiment showing openings and removable plugs.

Referring back to FIG. 4 the bladder 48 defines a volume bounded by the inner wall 64. Where the structure is large, such as being sized to accommodate humans or supplies, the exhaust ports 36 are ideally distributed across the containment member. A particular arrangement of exhaust ports 36 is chosen depending on the shape of the structure, and may be determined following a detailed analysis and/or testing of fluid flow through the containment member. Referring now to the inflatable bladder 48, the bladder 48 is attached to the containment member and has at least one pressurizing port, see, by way of example, element 52 in FIG. 1. The bladder 48 may be attached using a variety of mechanisms, such as a spacer 49 as is illustrated in FIG. 4 or a plug 50 as shown in FIG. 6. The bladder 48 can be inflated through the pressurizing port 52 clearly shown in FIG. 1. Inflation of the bladder 48 also erects the containment member and gives the structure 10 its shape prior to rigidization (see for example FIG. 4). The bladder 48 may be inflated with any gas or liquid. In the case of a biosphere, such as a habitat, the bladder itself may serve as a space that can support living organisms 60, in this case shown as humans.

In general the containment member has at least one flexible inner wall 64, (refer to FIG. 5) which is spaced interiorly from the outer wall 22 by a pre-determined distance 68. The inner wall 64 and the outer wall 22 form a closed region that serves to contain the rigidizable fluid. The inner wall thickness 72 and pre-determined distance 68 will generally be selected to optimize properties as stiffness or strength. The bladder 48 defines volume which is bounded by the inner wall 64.

The placement of the openings 32 which are fed by injection hose 190 are arranged on a first end around a central axis 92 as a means for uniformly introducing the rigidizable fluid into the structure. The exhaust ports 36 are arranged in order to optimally exhaust unwanted pressure from the structure.

Referring back to FIG. 6, the structure has an opening 32 which is fluidically in contact with the region defined in cross-section 96. The opening is sealable with a plug 50, which has a matching cross-section 99. The plug 50 may be removed if desired. Commonly, the plug 50 is formed from at least one tube or disc 104 having a central axis 92. The openings 32 are generally arranged on the plug 50 around the axis 92. The exhaust ports 36 are arranged on the plug at the opposite end and are ideally similarly situated around the axis 92. While not shown in FIG. 6 the bladder would be situated in the cylinder and has an opening 97. The opening 97 is sealable with a plug 54, which has a matching cross-sectional area 100. The plug 54 may be removed if desired. The plug, in various embodiments may be made from a variety of materials, including open and closed cell foams. Additionally, many other lightweight materials may be used. Specifically, and by way of non-limiting example only extruded polystyrene foam is contemplated. Such foam, with closed cells, is sold under the trade name STYROFOAM™ and is available from the Dow Chemical Company, 2030 Dow Center, Midland, Mich.

While various materials have been discussed herein, it is contemplated that the outer and inner walls can be fabricated from a variety of materials including polyimide film, other thin film, fabric, and composite fabric. In general, the selection process will look to optimize functionality based on intended use. Commonly weight and strength will be important factors that will be considered.

The present invention, in another embodiment can take the form of a dome shaped enclosure, see for example FIG. 4. When rigidized such an enclosure is suitable as habitation in terrestrial or extraterrestrial environments, or as a biosphere, whereby a physical barrier is provided, and such barrier prevents or limits physical interaction between the biosphere and the external environment.

Structural panels, such as is illustrated in FIG. 3 will find application in a variety of settings including the construction of a sail, such as a solar sail, or structural panel. Such a panel may find utility in conjunction with a rigid shaft or tube, consistent with FIG. 1. Such a shape might also be used as a support structure as part of a truss arrangement or for deploying and erecting further structures. Another application may be the formation of toroidal structure, such as is illustrated in FIG. 14 et seq. Toroidal structures may be used as supports for parabolic dishes, Fresnel lenses or other components. It is also contemplated that the toroidal structure may find utility in the marine environment as a component in an emergency lifeboat, or other flotation device.

In another variant, a container for holding the rigidizable structure is provided. The structure may be collapsed and fully contained within the interior space of the container thus facilitating compact storage and easy transport. The structure may be erected out of the container when rigidizable fluid is injected into the appropriate void. The interior surface of the container, in some embodiments, at least partially frictionally engages the structure and thereby controls the deployment rate. This is especially so for tubular structures. For domes or spheres, a fairly small section of the deploying structure would be frictionally engaged by the container walls. The structure can be erected from the container by inflating the bladder. Frictional engagement by the interior surface of the container can be used as a means for controlling the erection rate of the structure.

A variant, illustrated in FIG. 4 includes a spacer 49 that is attached to at least one point between the inner wall 64 and the outer wall 22. The spacer 49 may be used for maintaining a predetermined separation between the inner wall 64 and the outer wall 22 at least while the rigidizable fluid is introduced into the volume defined between the inner wall 64 and the outer wall 22. The spacer 49 may also be used to connect the outer wall 22 to the inner wall 64. In this case, moving one wall will also move the other wall. The inner wall 64 thickness, the outer wall 22 thickness and the pre-determined distance between the two walls is selected to achieve a desired structure stiffness, strength, and weight. Stiffness and weight may be varied according to the application for the structure. For example, a support structure might require greater stiffness than a habitation structure. Thicker walls typically increase stiffness, strength, and weight.

FIG. 5, as discussed above, includes a pressurizing hose 189, which may be attached to the pressurizing port 52 to transfer pressure from a pressurizing source. The pressurizing hose may be folded or rolled into the container together with the structure. The pressurizing hose 189 may be removed after inflation of the structure 10 or remain permanently attached. The injection hose 190 may be attached to the opening 32 to transfer rigidizable fluid from a rigidizable fluid source 182. The injection hose, like the pressurizing hose may be folded or rolled into the container together with the structure. Moreover, like the pressurizing hose, the injection hose may be removed after inflation of the structure or may remain permanently attached. In a further variant, the injection hose 190 has a predetermined cross-section 198. The cross-section 198 enables the hose to be inserted into the opening 32 and between the inner wall 64 and the outer wall 22 to access remote regions of the containment member 18. The hose 190 may be controllably removed as the containment member 18 fills with rigidizable fluid 14. This prevents the detrimental effect of rigidizable fluid 14 spraying radially outwards from the hose exit, and promotes foam advancing along the length of the containment member 18. In yet a further variant the container is attached to a spacecraft or a planetary surface or terrestrial support.

A variant discussed above and illustrated in FIGS. 7 and 7A provides an inner wall 64 which is a first tube 112. The outer wall 22 includes a second tube, having an axis, which is co-axial with the first tube 112. In a pre-deployed state, the structure is collapsed longitudinally along the tube axis. A container 120 is provided to contain the collapsed structure and provide support during deployment. The container may be formed from one or more additional tubes. When the bladder is inflated and the structure is erected from the container, the first outer surface frictionally engages the inner wall thereby controlling the erection rate out of the container. The size of the opening 32 can be designed to control the flow rate of the rigidizable fluid into the containment member. A larger port size will enable a greater flow rate, which may be desirable in some applications. Flow rate may be adjusted to reduce or overcome frictional resistance between the rigidizable fluid and structure and to overcome viscosity related issues of the rigidizable fluid.

Referring back to FIG. 8, the fasteners 170 are optionally attached to the structure 10 and are arranged in a series along the length of the structure 10. Each of the fasteners 170 can fasten with another fastener 170 when the structure 10 is collapsed. When the structure 10 is erected, the fasteners 170 provide some resistance as they release, thereby controlling the erection of the structure 10. The fastening can be achieved using a variety of fasteners. Examples of fasteners 170 include magnets, adhesives as well as hook and loop systems.

In some versions, as discussed previously, and illustrated in FIG. 9, a container 120 for the structure is provided and the structure is collapsed inside the container 120. As illustrated, a ring 51, substantially rigid or semi-rigid or inelastic may be provided to add substance to the structure and prevent bulging of the structure 10. The use of such a ring is especially desirable if the cross-sectional area of the structure 10 is square or rectangular. In alternative embodiments, especially useful with structures 10 having substantially circular cross-sections, the ring may comprise a substantially inelastic string or wire, which confines expansion, and adds additional lateral rigidity and prevents bulging. In some embodiments the ring 51 would be lightweight, polymer based or polymer composite. When a high in-plane stiffness material is used for the structure 10 it may be desirable to eliminate the ring 51. A polyimide film such as KAPTON® manufactured by DuPont (Wilmington Del.) in one example of such a high plane stiffness material. A tether 166 is also provided; the tether is attached to the structure 10 (as illustrated in FIG. 8) and the container 120. The tether can be attached either inside or outside the structure. In FIG. 9, the tether could alternatively be inside the structure and aligned with the central axis of the structure.

When the structure is erected from the container 120, the tether 166 is controllably reeled out, or otherwise dispensed in a controlled manner, thereby controlling the erection of the structure 10 out of the container 120.

In a further variant previously discussed with respect to FIG. 13, at least one pressure transfer hose 174 is provided. The pressure transfer hose 174 is attached to, or contained within, the structure 10. The pressure transfer hose 174 can be used to transfer pressure to an additional bladder (not shown) on an additional structure 11. This may be particularly desirable when assembling several structures 10 together to form an assembled structure 178. A single pressurizing source can be used to inflate an entire assembly 178. The transfer hose 175 can be attached to or contained within the structure 10. The transfer hose 175 can be used for transferring rigidizable fluid 14 into at least one additional containment member. This may be particularly desirable when assembling several structures 10 together to form an assembled structure 178. A single rigidizable fluid source 182 can be used to rigidize an entire assembly 178. An example of an assembly might include a support for a parabolic dish or Fresnel lens. In other embodiments, the assembly may include habitable structures, storage areas, storage containers, and camouflage systems. In another embodiment, the structure includes a plurality of rigidizable fluid containment areas and a network of transfer hoses, wherein the structure takes the form of a useful article. In this embodiment, it is specifically anticipated that a plurality of supports, which provide form are spanned by a matrix of film, cloth, or other sheeting. It is further contemplated that a structure, once assembled, may readily be modified to take another form by adjusting the angle of the connectors 186. Contemplated structures include enclosed storage structures including at least one movable door. The movable door relies on at least one flexible connector. An articulating joint with one degree of freedom would be sufficient. Another structure might be an enclosed dwelling. The dwelling structure could include at least one door including at least one articulating joint, and at least one window. The window may be an aperture or it may be a substantially transparent film serving as a window. The substantially transparent film may be tinted to control the admission of various regions within the electromagnetic radiation spectrum or to distort views while allowing the passage of light. In another embodiment, the structure may be a support for equipment including a base and at least one component not in the plane of the base. In another embodiment, the structure may take the form of an open topped fluid container. Such a system could be deployed to areas where rain is anticipated but water is traditionally in short supply. The container may also include a funnel or funnel like device that allows maximum collection of precipitation while minimizing evaporation.

In variant illustrated in FIGS. 13 and 14C, the connector 186 attaches to the structure 10 and at least one additional structure. The connector 186 may be used to securely connect structures 10 together to form an assembled construction 178, such as a support structure for a parabolic dish. The connector 186 may also be used to deploy or move additional structures 11 when the bladder is inflated or when rigidizable fluid 14 is injected into the containment member. In still another variant, the connector 186 is shaped with a rotatable angled elbow. This may be useful when connecting structures 10 together at an angle. The angle may be any angle including 90 degrees. The connector 186 may also be rotatable relative to the structures 10 to enable flexibility in the formation of the assembly. The connector 186 may take the form of a T-shaped connector or a cross-shaped connector. It is contemplated in FIG. 14C, that the container 200 serves as a platform to anchor and secure several structures 10 together.

In another variant illustrated in FIG. 14C, the structure 10 is used as a support for at least one additional structure. The structure can form part of a truss, a beam, a boom, or a scaffold. In a variant as illustrated in FIGS. 14, 14A, 14B and 14C, at least three structures 10 and at least three additional structures are selected. Each structure 10 is connected to at least two additional structures. The three additional structures form a toroid 12 when placed end to end. Such an assembly can be used to support a parabolic dish, Fresnel lens and the like.

In another variant as illustrated in FIG. 14C, each additional structure may be connected to at least one other additional structure. In such a case, each additional structure has at least one transfer hose for transferring rigidizable fluid into another additional structure, and at least one pressure transfer hose for transferring pressurized fluid into another additional structure. Additionally, the structure 10 and additional structure are packaged into a main container 200 prior to inflation. The main container 200 has a rigidizable fluid source 182 and a pressure source 181. The entire assembly can be inflated from the single pressure source 181 in the main container. Fluid may be transferred to bladders and additional bladders through a network of pressure transfer hoses. The entire assembly can also be rigidized from a single rigidizable fluid source 182. Rigidizable fluid may be transferred to containment members and additional containment members through a network of transfer hoses. The additional bladders are de-pressurized following rigidization of the additional structures.

The rigidizable fluid may be in the form of a foam and the foam may be selected for desired properties such as curing time, expansion time, curing method and ease of implementation. Examples of foam include self-curing foam, heat cured foam, cooling cured, and radiation cured foam, two-component foam, one component foam and the like. Non-limiting examples of commercially available products include HANDI FOAM TWO COMPONENT QUICK CURE II-2™, HANDI FOAM ONE COMPONENT POLYURETHANE FOAM™, both available from FOMO Products Inc at 2775 Barber Road PO Box 1078 Norton, Ohio 44203 USA and GREAT STUFF™ polyurethane foam available from the Dow Chemical Company, 2030 Dow Center, Midland, Mich. 48674. Foam may be non-permanent or compressible, such as upon heating so that the structure might be collapsed after it has been rigidized. The rigidizable fluid may selected based on its density. The rigidizable fluid density often can be used to help determine parameters such as structure stiffness, tensile strength, and weight. For example, commercially available foam, sold under the trade name HANDI FOAM™ two-component quick cure foam has a density of 1.75 lbs/cubic foot. This foam has a tensile strength of 46 psi and a compressive strength of 23 psi. Another example of foam, which might be used, GREAT STUFF™ polyurethane foam, has a lower density of 1.7 lbs/cubic foot and therefore a smaller weight, but a smaller tensile strength (22.3 psi) and compressive strength (9.7 psi). Parameters such as stiffness and strength are also determined by the combined interaction of the foam and the material used to fabricate the containment member.

Another variant, illustrated in FIG. 14C, provides a container 200 that includes a rigidizable fluid source 182 capable of providing rigidizable fluid to an entire structure 10 assembly via a network of transfer hoses. The container 200 may also contain at least one structure and a pressurizing source 181. The pressurizing source 181 is capable of providing pressurizing fluid for pressurizing an entire structure assembly via a network of pressure transfer hoses.

The present invention also provides a method for erecting and rigidizing a structure having an inflatable bladder attached to a containment member. The containment member includes at least one inner wall and at least one outer wall. First, the bladder is inflated to erect the structure. When rigidizable fluid is introduced uniformly into the containment member between the inner wall and the outer wall 22, for example by pouring or injection, the rigidizable fluid advances throughout the containment member and may release gas as it cures. The released gas is vented from the containment member to prevent the released gas from impeding the uniform distribution of injected rigidizable fluid.

In a further variant of the method, the rigidizable fluid is injected through an arrangement of injection ports placed at one end of the structure. The curing rigidizable fluid is vented using an arrangement of exhaust ports. The venting arrangement is designed according to the shape of the structure. For example, in an elongated body it is generally preferable to place the venting ports at a second end opposite the first end. For a large body, it may be preferable to distribute venting ports uniformly across the structure.

The method also provides for a structure that is collapsed and packaged in a container prior to inflation of the bladder. When the bladder is inflated, the structure is erected from the container. The container grips the structure to control and guide the structure out of the container.

The method contemplates that the container grips the structure by frictional engagement. In some embodiments, the structure includes a tubular inner wall, a tubular outer wall, and an axis. The structure is collapsible longitudinally along the plug axis into an accordion shape in order to be packaged into the container. In a further variant of the method, the bladder can be de-pressurized after the rigidizable fluid has cured. In another embodiment of the method, the rigidizable fluid can be introduced into a structure prior to packaging. The structure may have at least one spacer between the inner wall and the outer wall. In this case, the spacer prevents the inner wall and outer wall from sticking together.

In a further variant of the method, the structure is attached to an additional structure prior to inflation of the bladder. When the bladder is inflated, the additional structure can be moved or deployed. The structure is thus used as a crane to erect other structures. Alternatively, the additional structure having an additional bladder, an additional containment member, an additional outer wall, and an additional inner wall is connected to the structure prior to inflation of the bladder. The structure deploys the additional structure when the bladder is inflated. The additional bladder is inflated through the pressure transfer hose. Rigidizable fluid is introduced into the additional containment member through at least one transfer hose. Excess fluid and gases created during fluid rigidization are vented from the additional structure and the rigidizable fluid is allowed to cure.

A method for fabricating a tubular wall is disclosed as follows, and reference will be made to FIG. 15. A tubular mold 204 with a predetermined cross-section 208, a predetermined perimeter 212, and a predetermined length 216 is selected. A section of flexible material 220 with the same predetermined length 216 and a width 224 greater than the predetermined perimeter 212 is also selected. The width of flexible material 224 is wrapped around the tubular mold 204. The two ends of the width 224 are secured together forming a seam. The tubular mold 204 is removed leaving a tubular wall having a first and a second end. In alternative embodiment of the method, the tubular mold 204 selected is a section of PVC pipe.

Another variant as illustrated in FIG. 16 includes a solid disc 228 shaped from lightweight material. The disc has a height 232 and the same pre-determined cross-section 208 as the tubular mold 204. The cross-section is bored with at least one bore 236 extending along the entire length of the disc height 232. The disc 228 is attached to the tube first end. An identical disc can be manufactured for attachment to the second tube end. The disc may be attached with silicone adhesive 240, epoxy or other means. The tube is inserted in a second tube having a larger cross-section. In a variant, the solid disc 228 is formed having a first pre-determined cross-section 208 and a second solid disc 228 is formed having the larger cross-section. The discs are attached together co-axially with adhesive 240. The present invention, in some embodiments includes rotatable connectors for use in conjunction with the delivery of the rigidizable fluid. In some case the rigidizable fluid will be delivered directly to a plurality of manifolds where is will subsequently be delivered to elements which will provide structure. The use of a main container as base for use with spacecraft and on planetary surfaces is yet another area of application for the present invention. In another embodiment, alluded elsewhere the structural assembly including that similar to the assembly depicted in FIGS. 13 and 14 may optionally include an arrangement of pressure hoses, fluid hoses, and connectors, which are useful in creating useful articles with the present invention.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered the most practical and preferred embodiments, it is to be understood that the present invention is not limited to the disclosed embodiment but, on the contrary, is intended to cover various modifications and equivalent arrangements included within the scope of the appended claims.

The invention claimed is:

1. A rigidizable structure comprising:
a collapsible containment member, said containment member being formed of flexible material, having at least one outer wall defining a closed interior space and at least one sealable opening and at least one flexible inner wall;
said outer wall having a thickness;
said outer wall having at least one exhaust port adapted to venting excess pressure and gas byproducts of injected fluid rigidization material;
said inner wall spaced interiorly from said outer wall by a pre-determined distance, said inner wall having a thickness;
an inflatable bladder, said bladder being disposed within and attached to said containment member and erecting said containment member when inflated;
said bladder having at least one pressurizing port for inflating said bladder;
said bladder enclosing a volume bounded by said inner wall; and
a rigidizable fluid, said fluid being introduced into said containment member through said at least one sealable opening and subsequently rigidized to provide structural support for said structure.

2. The structure of claim 1, wherein said bladder further comprises:
at least one secondary opening;
a plug having a cross-section;
said plug adapted to seal with said secondary opening;
said plug having said at least one pressurizing port; and
said plug forming a removable part of said bladder.

3. The structure according to claim 1, fabricated from materials selected from the group consisting of:
polyimide film, other thin film.

4. The structure of claim 1 wherein said inner wall is formed as a tube:
said tube having a first predetermined cross-section, a first predetermined length, a first end and a second end;
said outer wall surrounding said inner wall; and
said first end having at least one of said sealable openings.

5. The structure of claim 1 wherein said outer wall is formed as a tube:
said tube having a predetermined cross-section, a predetermined length, a first end and a second end;
said first end having at least one of said sealable openings; and
said second end having at least one of said exhaust ports.

6. The structure of claim 1 wherein said rigidizable structure has a cross-section that varies arbitrarily between a first end and a second end at any given stage of expansion.

7. The structure of claim 1 further comprising:
a container having a container wall defining an interior space;
said interior space adapted to contain said structure prior to erection and rigidization;
said container wall having an interior surface and an exterior surface; and
said interior surface frictionally engaging and controllably erecting said structure out of said container as said containment member fills with fluid.

8. The structure of claim 1 comprising:
said inner wall comprising a first tube having a first axis, a first predetermined length, a first end and a second end;
said outer wall comprises a second tube having a second axis co-axial with said first tube, a second predetermined length, a third end and a fourth end;
a container formed from a third tube and a fourth tube;
said third tube having a first inner surface, a first outer surface, a third predetermined length shorter than said first predetermined length;
said container adapted to containing said first tube when said inner wall is collapsed along said first axis;
said container adapted to containing said second tube when said outer wall is collapsed along said second axis;
said first outer surface adapted to being concentrically surrounded by said first tube;
said first outer surface frictionally engaging said first tube and controllably erecting said structure when said bladder is inflated;
said fourth tube has a second inner surface and a second outer surface;
said second inner surface surrounding said first tube and said second tube; and
said second inner surface frictionally engaging said second tube and controllably erecting said structure when said bladder is inflated.

9. The structure of claim 1 further comprising:
a container adapted to containing said collapsible containment member;
a first tether attached between said container and said structure; and
said first tether adapted to being reeled out and controllably erecting said collapsible containment member.

10. The structure of claim 1, further comprising:
a plurality of rigidizable fluid containment areas and a network of transfer hoses, wherein the structure takes the form of a useful article selected from the group consisting of:
i. an enclosed storage structure including at least one movable door;
ii. an enclosed dwelling structure including at least one door and at least one window;
iii. a support for equipment including a base and at least one component not in the plane of the base;
iv. framework for supporting advertising displays;
v. an open topped fluid container;
vi. truss structure comprised of numerous tubular inflatable and rigidizable members; and
vii. arrangement comprising a toroidal structure and tubular support structures, with toroid capable of supporting a Fresnel lens, parabolic lens or reflector, or other components.

11. The structure of claim 1 further comprising:
fasteners attached to said structure, said fasteners arranged in a series along a length of said structure;
each of said fasteners adapted to fastening with another of said fasteners in said series when said structure is collapsed; and
said fasteners adapted to releasing when said structure is erected; and said fasteners include, but are not limited to, a group comprising of a hook and loop fastener and magnetic fastener.

12. The structure of claim 1 further comprising at least one pressurization hose for transferring pressure into at least one additional bladder and at least one fluid transfer hose for transferring rigidizable fluid into at least one additional structure.

13. The structure of claim 1 further comprising a connector adapted to securely connecting said structure with at least one additional structure to form an assembled construction; said connector adapted to contain at least one pressurization hose.

14. A method for erecting and rigidizing a structure including the steps of:
- selecting at least one structure having an inflatable bladder disposed within and attached to a collapsible containment member;
- said containment member being formed of flexible material and having an inner wall and an outer wall;
- inflating said bladder to erect said structure;
- introducing rigidizable fluid uniformly into said containment member between said inner wall and said outer wall;
- allowing said rigidizable fluid to distribute uniformly throughout said containment member;
- curing said rigidizable fluid; and
- venting excess fluid and gases produced during fluid rigidization from said structure.

15. The method of claim 14 further including the steps of:
- injecting said rigidizable fluid through an arrangement of injection ports;
- said injection ports located at a first end of said structure; and
- venting said structure through an arrangement of exhaust ports.

16. The method of claim 14 further including the steps of:
- selecting at least one additional structure, said additional structure having an inflatable bladder attached to an additional containment member, said additional containment member having an additional inner wall and an additional outer wall, said structure having a pressure transfer hose and a rigidizable fluid transfer hose;
- connecting said structure to said additional structure prior to inflating said structure;
- allowing said structure to deploy said additional structure when said bladder is inflated;
- inflating said additional bladder through a pressure transfer hose;
- introducing rigidizable fluid into said additional containment member through at least one transfer hose;
- curing said rigidizable fluid; and
- venting excess rigidizable fluid and gases produced during fluid rigidization from said additional structure.

* * * * *